United States Patent
Fuller (10) Patent No.: US 11,879,557 B1
(45) Date of Patent: Jan. 23, 2024

(54) CLAPPER CHECK VALVE ASSEMBLY

(71) Applicant: SPM OIL & GAS INC., Fort Worth, TX (US)

(72) Inventor: Nadiya V. Fuller, Plano, TX (US)

(73) Assignee: SPM Oil & Gas Inc., Fort Worth, TX (US)

( * ) Notice: Subject to any disclaimer, the term of this patent is extended or adjusted under 35 U.S.C. 154(b) by 0 days.

(21) Appl. No.: 17/822,586

(22) Filed: Aug. 26, 2022

(51) Int. Cl.
*F16K 15/03* (2006.01)
*F16K 27/02* (2006.01)

(52) U.S. Cl.
CPC .......... *F16K 15/03* (2013.01); *F16K 27/0209* (2013.01); *Y10T 137/7898* (2015.04)

(58) Field of Classification Search
CPC ...... F16K 15/03; F16K 15/033; F16K 15/034; Y10T 137/7898; Y10T 137/7902; Y10T 137/7903
See application file for complete search history.

(56) References Cited

U.S. PATENT DOCUMENTS

| | | | |
|---|---|---|---|
| 305,722 A * | 9/1884 | Tomlinson | F16K 15/03 137/527.2 |
| 2,482,198 A * | 9/1949 | Melichar | F16K 15/033 251/303 |
| 2,877,790 A * | 3/1959 | Wilhelm | B67D 1/0835 251/339 |
| 2,894,718 A * | 7/1959 | Englert | F16K 15/03 251/332 |
| 2,981,282 A * | 4/1961 | Mack | F16K 15/00 251/360 |
| 3,075,547 A | 1/1963 | Scaramucci | |
| 3,144,876 A * | 8/1964 | Frye | F16K 15/03 417/559 |
| 3,307,633 A * | 3/1967 | Newall | F16K 15/03 169/22 |
| 3,789,874 A * | 2/1974 | Hills | F16K 31/52441 251/303 |
| 4,090,529 A | 5/1978 | Schuller et al. | |
| 4,474,358 A * | 10/1984 | Bennett | F16K 1/46 251/900 |
| 5,855,224 A * | 1/1999 | Lin | E03B 7/077 137/527 |
| 5,909,748 A * | 6/1999 | LaCroix | F16K 17/0413 137/527 |
| 6,343,618 B1 * | 2/2002 | Britt | F16K 15/035 137/527 |
| 10,197,172 B2 | 2/2019 | Fuller et al. | |
| 11,261,979 B2 | 3/2022 | Soltau et al. | |
| 2006/0102233 A1* | 5/2006 | Scaramucci | F16K 15/033 137/527.4 |
| 2018/0112780 A1* | 4/2018 | Rain | F16K 1/46 |
| 2021/0095772 A1 | 4/2021 | Partridge | |
| 2021/0222783 A1* | 7/2021 | Okuno | F16K 15/148 |
| 2022/0018446 A1 | 1/2022 | Witkowski | |

* cited by examiner

Primary Examiner — Robert K Arundale (57) ABSTRACT

A clapper comprises a first valve body piece, a second valve body piece, wherein the second valve body piece is separate from the first valve body piece, and a seal. The first valve body piece has a seal groove. The second valve body piece has an angled edge. The seal is disposed in the seal groove of the first valve body piece. When the first and second valve body pieces are coupled together, radial compression of the seal between the seal groove and the angled edge causes the seal to be retained within the clapper.

19 Claims, 4 Drawing Sheets

CLAPPER CHECK VALVE ASSEMBLY

TECHNICAL FIELD

The present disclosure relates generally to valves used in oil or gas operations. More particularly, in certain embodiments, the present disclosure is related to a clapper check valve assembly.

BACKGROUND

In oil or gas operations, a clapper valve may be used as a check valve to control the flow of fracturing or gravel-packing fluids. A clapper valve permits fluid flow in a first direction but prevents or reduces fluid flow in a second, opposite direction. Vibration caused by turbulence in the flow of fluid through the clapper valve often produces significant wear to certain components of the clapper valve. Further, the effectiveness of the clapper valve in preventing or reducing fluid flow in the second direction is often diminished as a result of improper alignment and/or excessive loading of the internal components of the clapper valve.

SUMMARY

This disclosure contemplates an improved design for a clapper valve which provides several technical advantages that overcome the previously discussed technical problems. Prior clappers of a clapper valve have been constructed as a singular structural component. These prior clappers experience wear along critical areas, such as along a pin passageway where the clapper rotates. The clappers further encounter separation of the sealing part from the clapper as a result of delimination of the connection between the sealing part and a metal part of the clapper under the working fluid flow. To increase the wear resistance and fatigue life of the clapper and to prevent the seal separating from the metal part of the clapper, the following disclosure provides a multi-component clapper comprising different material properties.

For example, the disclosed clapper has a material with greater corrosion resistance facing an incoming fluid flow and a different material with a greater wear resistance for the critical areas. Both materials may be coupled together to form clapper where a threaded connection may be employed to couple parts of the clapper together. In an example, the seal along the edges of a clapper can be dislodged or broken due to the turbulence of fluid flow and/or the continuous operation of the clapper valve. To prevent dislodging or structural failure, the seal can be secured within a groove formed along the edges of the clapper. Coupling separate components of the clapper together can produce a compression fit for the seal into the formed groove, thereby maintaining the placement of the seal in the groove. The present disclosure contemplates an improved configuration for maintaining the seal within the groove and for coupling the different components of the clapper together, where the different components have different material properties, such as increased wear and corrosion resistance.

In an embodiment, a clapper comprises a first valve body piece, a second valve body piece, wherein the second valve body piece is separate from the first valve body piece, and a seal. The first valve body piece has a seal groove. The second valve body piece has an angled edge. The seal is disposed in the seal groove of the first valve body piece. When the first and second valve body pieces are coupled together, radial compression of the seal between the seal groove and the angled edge causes the seal to be retained within the clapper.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

This disclosure provides solutions to the aforementioned and other problems of previous technology by providing compression and sufficient interlock to at least a portion of a seal of a clapper to maintain the seal in a designated groove. For example, a clapper may be pivotably coupled to a hanger and operable to open and close against a valve seat within a valve assembly. During operation, a fluid flow may be introduced to flow through the valve seat and push against the clapper, moving the clapper from a closed position to an open position. The seal may be dislodged from the groove due to turbulence from the fluid flow and/or vibrations. To maintain the seal within the groove, the clapper may provide a secure interlock between separate valve body pieces to compress at least a portion of the seal, thereby securing the seal to the groove.

Example Valve Assembly

Figure 1:
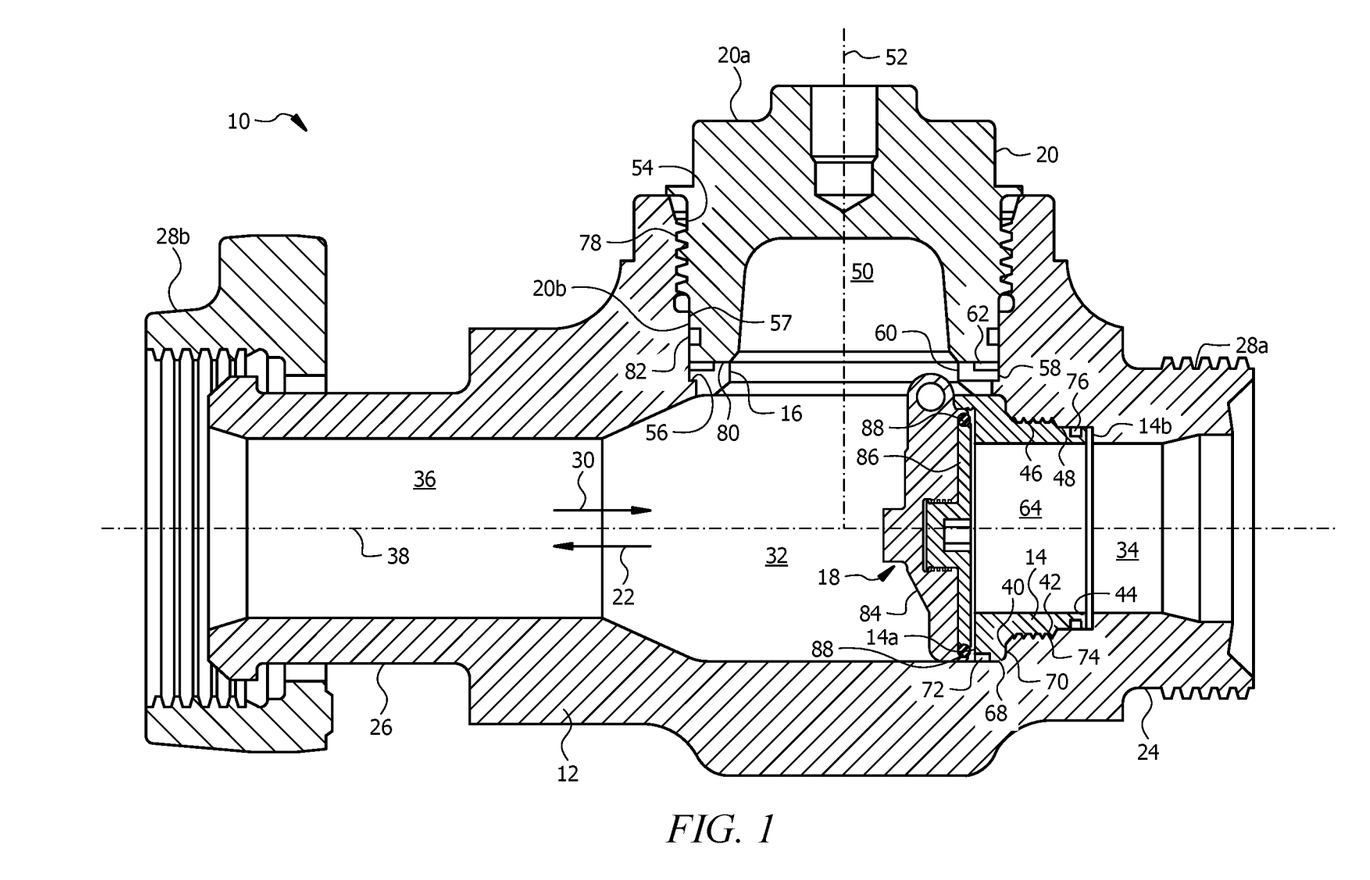
FIG. 1 is a cross-sectional view of an example valve assembly.

FIG. 1 illustrates a cross-sectional view of an example valve assembly 10 that is generally configured for use in oil or gas operations. The valve assembly 10 may include a valve housing 12, a valve seat 14, a hanger 16, a clapper 18, and a cap 20. The valve assembly 10 may be configured to be incorporated into a flowline through which fluid ordinarily flows in a first axial direction 22. Accordingly, the valve housing 12 includes an inlet end 24 and an outlet end 26. A pair of flowline connectors 28a and 28b may be associated with the inlet and outlet ends 24 and 26, respectively, of the valve housing 12. The flowline connectors 28a and 28b may be configured to couple the valve housing 12 to the flowline so that fluid flow through the valve housing 12 is permitted in the first axial direction 22 and prevented, or at least reduced, in a second axial direction 30, which is opposite the first axial direction 22.

In one or more embodiments, at least one of the flowline connectors 28a and 28b may be a male half of a hammer union, and the other one of the flowline connectors 28a and 28b may be a female half of a hammer union. As shown in FIG. 1, the flowline connector 28a is a female half of a hammer union, and the flowline connector 28b is a male half of a hammer union. In additional embodiments, at least one of the flowline connectors 28a and 28b may be, include, or is part of another type of flowline connector having components that are not associated with a hammer union, such as, for example, components associated with a hammerless union, flanges, fasteners, welds, clamps, other components, or any combination thereof.

As illustrated in FIG. 1, the valve housing 12 may include an internal region 32 within which at least respective portions of the valve seat 14, the hanger 16, and the clapper 18 extend. The valve housing 12 may further include inlet passageway 34 and outlet passageway 36 each intersecting the internal region 32. In one or more embodiments, the inlet passageway 34 and the outlet passageway 36 may each extend substantially co-axially along a first axis 38. An internal shoulder 40 may be formed at the junction between the internal region 32 and the inlet passageway 34, generally facing in the first axial direction 22. In certain embodiments, the internal shoulder 40 may be disposed in a plane that is substantially perpendicular to the first axis 38. A counterbore 42 may be formed in the internal shoulder 40. The counterbore 42 may extend from the internal shoulder 40 in the second axial direction 30, thereby including a counterbore shoulder 44 in the valve housing 12. The counterbore shoulder 44 may generally face in the first axial direction 22, similar to the internal shoulder 40. Additionally, the counterbore shoulder 44 may be disposed in a plane that is substantially perpendicular to the first axis 38. An internal threaded connection 46 may be formed in the valve housing 12 at the counterbore 42. In embodiments, a generally cylindrical surface 48 may be formed in the interior of the valve housing 12, axially between the internal threaded connection 46 and the counterbore shoulder 44.

An access bore 50 may be formed in the valve housing 12 that intersects the internal region 32. The access bore 50 may extend along a second axis 52 that is substantially perpendicular to the first axis 38 of the inlet and outlet passageways 34 and 36. An internal threaded connection 54 may be formed in the valve housing 12 at the access bore 50. The access bore 50 may include an internal shoulder 56 in the valve housing 12, facing generally toward the internal threaded connection 54. In one or more embodiments, a generally cylindrical surface 57 may be formed in the interior of the valve housing 12, axially between the internal threaded connection 54 and the internal shoulder 56. The internal shoulder 56 may include a ledge 58 along a side of the internal shoulder 56 adjacent the counterbore 42. The ledge 58 may have a greater width or radial dimension relative to the second axis 52 than the remainder of the internal shoulder 56. The width or radial dimension of the ledge 58 may be the distance, along a radial line intersecting the second axis 52, between the sidewall of the access bore 50 and an edge 60 of the ledge 58. The edge 60 of the ledge 58 defines a straight profile. In one or more embodiments, the edge 60 of the ledge 58 may be disposed perpendicular to, or substantially perpendicular to, the first axis 38 of the inlet and outlet passageways 34 and 36. Alternatively, the edge 60 of the ledge 58 may define a curvilinear profile. One or more openings 62 may extend through the ledge 58 into the internal region 32. At least one of the openings 62 may be threaded holes.

The valve seat 14 may include opposing end faces 14a and 14b. A fluid passageway 64 may extend through the valve seat 14 along the first axis 38. The end faces 14a and 14b may be disposed in a plane that is substantially perpendicular to the first axis 38. The valve seat 14 may include a flange 68 formed in the exterior thereof, proximate the end face 14a. The flange 68 may include the end face 14a of the valve seat 14 and an external shoulder 70 that may face generally in the second axial direction 30. The external shoulder 70 may be disposed in a plane that is substantially perpendicular to the first axis 38. An external annular recess 72 may be formed in the flange 68, axially between the end face 14a and the external shoulder 70. The external annular recess 72 may be configured to be aligned with the one or more openings 62 in the ledge 58. The valve seat 14 may further include an external threaded connection 74 extending axially between the external shoulder 70 and the end face 14b. The external threaded connection 74 of the valve seat 14 may be configured to be threadably engaged with the internal threaded connection 46 of the valve housing 12. In embodiments, an external annular groove 76 may be formed in the valve seat 14 axially between the external threaded connection 74 and the end face 14b to receive any suitable seal.

As illustrated, the valve seat 14 is disposed within and may be coupled to the valve housing 12. The hanger 16 may additionally be disposed within the valve housing 12 and proximate the valve seat 14. In embodiments, the hanger 16 may be disposed substantially perpendicular to the valve seat. The cap 20 may be coupled to the valve housing 12 to secure the hanger 16 in position relative to the valve seat 14. The cap 20 may include opposing end portions 20a and 20b and an external threaded connection 78 extending axially between the end portions 20a and 20b. The external threaded connection 78 of the cap 20 may be configured to be connected to the internal threaded connection 54 of the valve housing 12. Further, the cap 20 may include an end face 80 at the end portion 20b thereof. An external annular groove 82 may be formed in the cap 20 axially between the external threaded connection 78 and the end face 80. The cap 20 may be configured to secure the hanger 16 and the clapper 18 within the valve housing 12 when the external threaded connection 78 of the cap 20 is threadably engaged with the internal threaded connection 54 of the valve housing 12. In one or more embodiments, the internal threaded connection 54 of the valve housing 12 and the external threaded connection 78 of the cap may be replaced by other connections utilizing, for example, flanges, fasteners, welds, clamps, or the like.

The clapper 18 may be pivotably connected to the hanger 16 and actuable between an open position, in which fluid flow is permitted through the valve housing 12, and a closed position, in which the clapper 18 is seated against the valve seat 14 to at least partially restrict fluid flow through the valve housing 12. The clapper 18 may be operable to allow fluid flow in the first direction 22 and restrict fluid flow in the second direction 30. The clapper 18 may be any suitable size, height, shape, and any combinations thereof. For example, the clapper 18 may have a generally circular cross-sectional shape. Further, the clapper 18 may comprise any suitable materials, such as metals, nonmetals, polymers, composites, ceramics, and any combinations thereof. As illustrated, the clapper 18 may comprise a first valve body piece 84, a second valve body piece 86, and a seal 88. During operation, the clapper 18 may initially be in the closed position, wherein the second valve body piece 86 may be seated against the valve seat 14. As a fluid flow is introduced into the valve assembly 10, the pressure against the second valve body piece 86 may actuate the clapper 18 to rotate from the closed position to the open position, thereby allowing fluid flow through the internal region 32 and out the outlet end 26. As the second valve body piece 86 may be directly exposed to fluid flow in comparison to the first valve body piece 84, the second valve body piece 86 may comprise a material having higher corrosion resistance than the first valve body piece 84. For example, the second valve body piece 86 may comprise stainless steel. Without limitations, stainless steel may be austenitic, ferritic, martensitic, duplex, and precipitation hardening, and the second valve body piece 86 may comprise any suitable type of stainless steel.

As the first valve body piece 84 may suffer from wear at the place of engagement with a pivoting pin (for example, pin 200 in FIGS. 2A and 2B) as a result of turbulent dynamic loads, the first valve body piece 84 may comprise a different material having different properties from that of the second valve body piece 86. For example, the first valve body piece 84 may comprise tool steel. Tool steel may be referred to as any of various carbon steels and alloy steels that are configured for tool manufacturing. Tool steel may comprise a carbon content between about 0.5% and about 1.5% and may be categorized by any one of the following group: water-hardening, cold-work, shock-resistant, high-speed, hot-work, and special purpose. In one or more embodiments, the first valve body piece 84 may comprise A2 tool steel or M2 tool steel with a hardness of about 52 HRC to about 55 HRC. Coupling the first valve body piece 84 with the second valve body piece 86 and the seal 88 forms the clapper 18. Any suitable material may be used for the seal 88, including urethane or rubber.

Figure 2A:
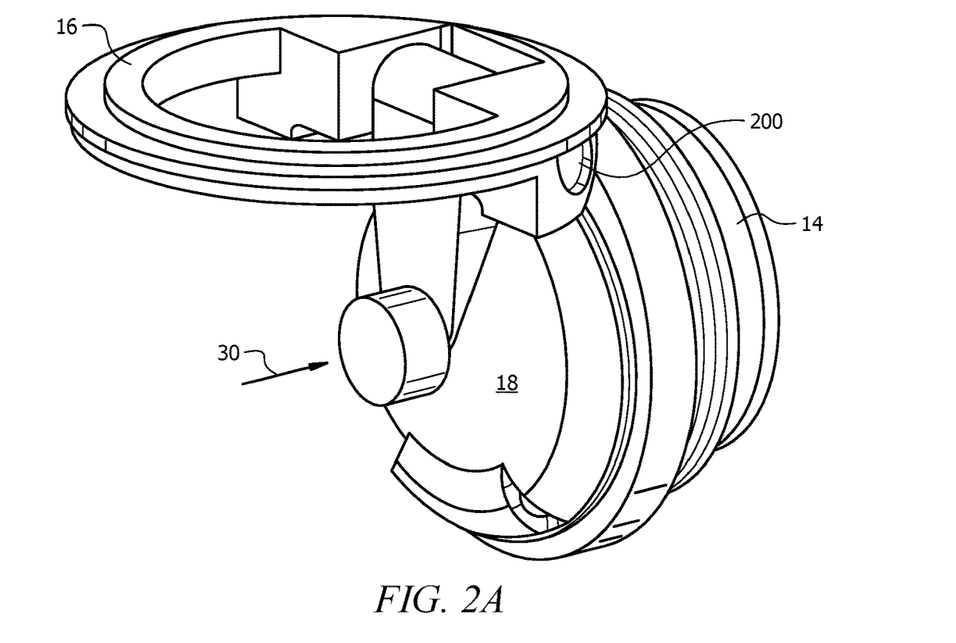
FIG. 2A is a perspective view of the valve assembly of FIG. 1 in a closed position.
Figure 2B:
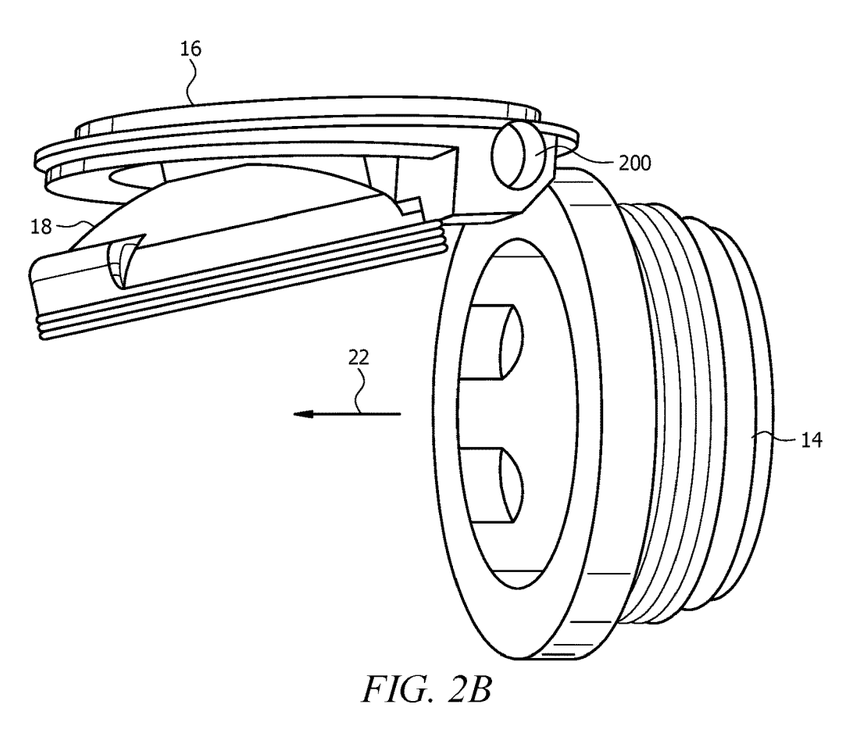
FIG. 2B is a perspective view of the valve assembly of FIG. 1 in an open position.

FIGS. 2A and 2B illustrate at least a portion of the valve assembly 10 in a closed position and in an open position, respectively. A pin 200 may be used to couple the clapper 18 to the hanger 16, wherein the clapper 18 may be configured to rotate about the pin 200. For example, a portion of the clapper 18 may be aligned with a portion of the hanger 16 operable to receive the clapper 18, and the pin 200 may be inserted through both the clapper 18 and the hanger 16. In one or more embodiments, the pin 200 may be replaced by any other suitable fastener(s), for example, studs, bolts, nuts, washers, screws, nails, rivets, and the like. As shown in FIG. 2A, the clapper 18 may be seated against the valve seat 14 when in the closed position, thereby preventing any backflow of fluid from flowing along the second direction 30. In embodiments wherein a fluid is introduced through the valve assembly 10 (referring to FIG. 1) or wherein there is an increase in the fluid flow where the fluid pressure along first direction 22 is greater than the fluid pressure along second direction 30, the clapper 18 may rotate about the pin 200 and away from the valve seat 14 to the open position to allow fluid flow through the valve assembly 10, as seen in FIG. 2B.

Example Clapper of the Valve Assembly

Figure 3:
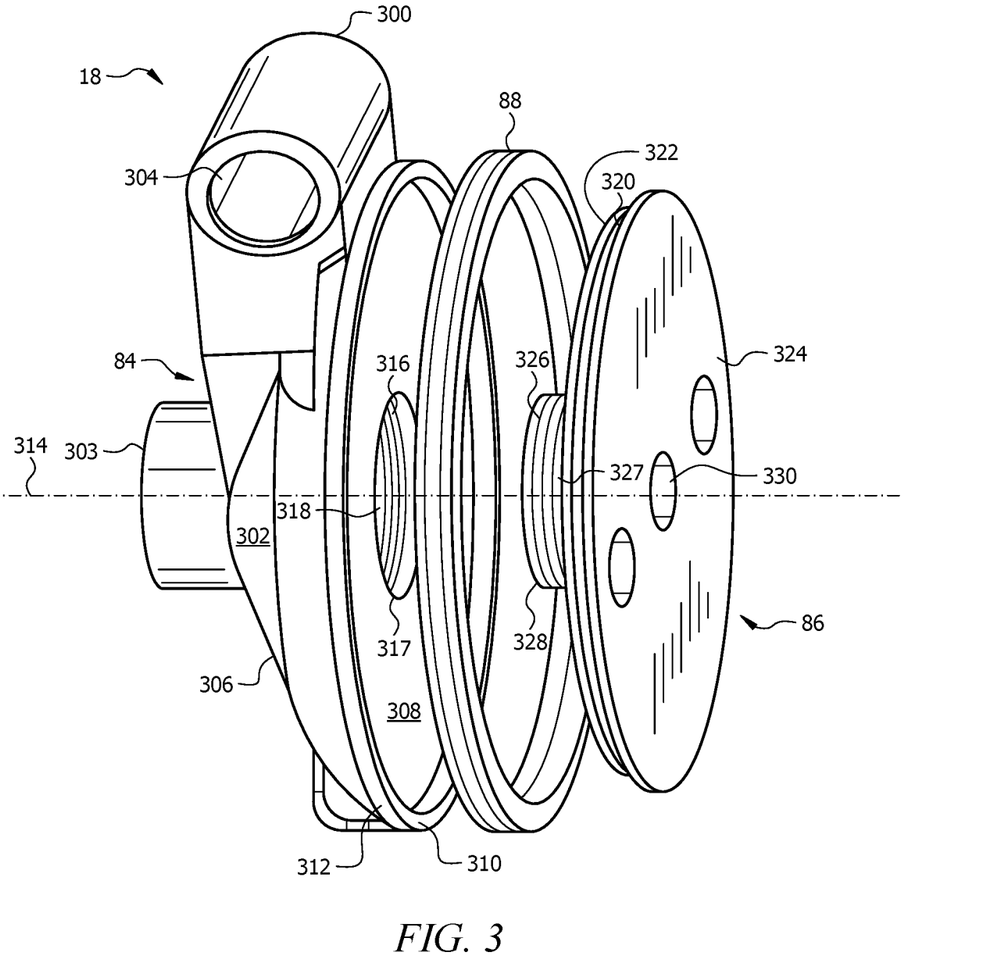
FIG. 3 is an exploded view of an example clapper of the valve assembly of FIG. 1.
Figure 4:
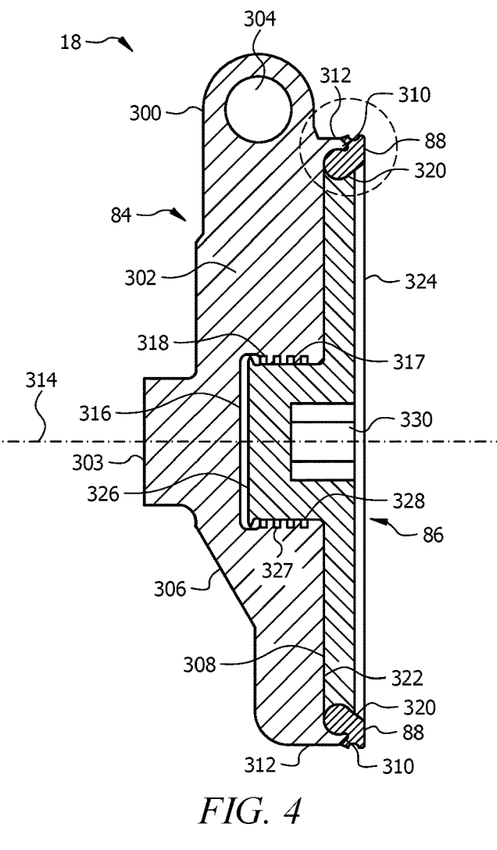
FIG. 4 is a cross-sectional view of the clapper of FIG. 3.

FIGS. 3-4 illustrate the example clapper 18 of the valve assembly 10 of FIG. 1. FIG. 3 shows the clapper 18 in an exploded view, and FIG. 4 provides a cross-sectional view of the clapper 18. As illustrated in FIGS. 3 and 4, the clapper 18 comprises the first valve body piece 84, the second valve body piece 86, and the seal 88. The first valve body piece 84 may comprise a hinged portion 300 and a base 302, wherein the hinged portion 300 may be disposed on top of or at a top end of the base 302. In embodiments, the hinged portion 300 may be integral to or a separate component from the base 302. The hinged portion 300 may be coupled to the base 302 via a coupler 303. The coupler 303 may be any suitable fastener(s), such as a pin, stud, bolt, nut, washer, screw, nail, rivet, and the like. For example, FIGS. 3-4 show a top end of the coupler (i.e., a head or cap) wherein a body portion of the coupler 303 may pass through at least a portion of the hinged portion 300 and base 302 to secure the hinged portion 300 to the base 302. The hinged portion 300 may define a pin passageway 304 operable to receive the pin 200 (referring to FIGS. 2A and 2B). The pin 200 may be inserted into the pin passageway 304 and into additional portions of the hanger 16 (referring to FIGS. 2A and 2B) once the pin passageway 304 is aligned with the respective portions of the hanger 16. The hinged portion 300 may be configured to operate as a hinge for the clapper 18, wherein the clapper 18 rotates between the open position and the closed position at the hinged portion 300.

Figure 5:
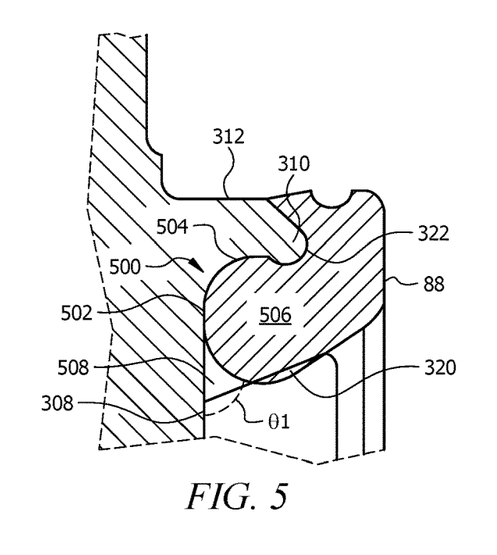
FIG. 5 is a cross-sectional view of an example groove and seal of the clapper of FIG. 4.

The base 302 may rotate as the hinged portion 300 rotates about the pin 200. The base 302 may comprise a first side 306, a second side 308, and a shoulder 310 (as best seen in FIG. 5). The shoulder 310 may extend from an outer edge 312 of the second side 308 and away from the second side 308. The shoulder 310 may be any suitable size, height, shape, and any combinations thereof. For example, the shoulder 310 may comprise curvilinear lines and generally extend at an angle inward towards a central axis 314 of the clapper 18. In some embodiments, the shoulder 310 may generally have a hooked-shape. As shown in FIGS. 3-4, the shoulder 310 may be disposed continuously along the circumference of the second side 308 of the base 302, thereby forming a closed circle along a plane perpendicular to central axis 314. In certain embodiments, the shoulder 310 may be disposed at a singular location along the circumference of the second side 308. In other embodiments, there may be a plurality of shoulders 310 disposed along the circumference of the second side 308.

The base 302 may further comprise a first recess 316 disposed at the second side 308 and extending into the base 302. The first recess 316 may be configured to receive at least a portion of the second valve body piece 86. The first recess 316 may be any suitable size, height, shape, and any combinations thereof. For example, the first recess 316 may be cylindrical. In certain embodiments, threading 317 may be disposed on a surface 318 of the first recess 316 (i.e., a threaded bore), wherein a threaded component may be threadably coupled to the first recess 316. The threading 317 may have a trapezoidal thread form, such as the Acme thread form. In other embodiments, the threading 317 may have a square thread form, a triangular thread form, or any other suitable shaped thread form. In certain embodiments, the threading 317 may be replaced by a suitable epoxy or adhesive. For example, an epoxy or adhesive may be coated on the surface 318 of the first recess 316 to form a bond with a component inserted into the first recess 316.

The second valve body piece 86 may comprise an outer radial surface or angled edge (herein referred to as the "angled edge 320"), a first side 322, and a second side 324. The angled edge 320 may be an edge of the second valve body piece 86 disposed between the first side 322 and the second side 324. The angled edge 320 may be disposed between an outer circumference of the first side 322 and the circumference of the second side 324. The angled edge 320 may be disposed at any suitable angle with respect to the central axis 314. For example, the angled edge 320 may be disposed at an angle at about 10°, 20°, 30°, 40°, 50°, 60°, 70°, 80°, or any intermediary angle.

The second valve body piece 86 may further comprise a protrusion 326 disposed at the first side 322 of the second valve body piece 86 and extending away from the first side 322. In certain embodiments, the first recess 316 of the first valve body piece 84 may be configured to receive the protrusion 326 to couple the second valve body piece 86 to the first valve body piece 84. The protrusion 326 may be any suitable size, height, shape, and any combinations thereof. For example, the protrusion 326 may generally comprise a shape configured to be received by the first recess 316. In this example, if the first recess 316 is cylindrical, the protrusion 326 may additionally be cylindrical with approximately the same diameter. The second valve body piece 86 may further comprise threading 327 disposed on a surface 328 of the protrusion 326 (i.e., a threaded stem), and the first valve body piece 84 may be threadably coupled to the second valve body piece 86 via the protrusion 326 and first recess 316. The threading 327 may have a trapezoidal thread form, such as the Acme thread form. In other embodiments, the threading 327 may have a square thread form, a triangular thread form, or any other suitable shaped thread form. In certain embodiments, the threading 327 may be replaced by a suitable epoxy or adhesive. For example, an epoxy or adhesive may be coated on the surface 328 of the protrusion 326 to form a bond with the surface 318 of first recess 316 as the protrusion 326 is inserted into the first recess 316.

The second valve body piece 86 may further comprise a socket 330 disposed along the second side 324 of the second valve body piece 86. The socket 330 may extend into the second valve body piece 86 and may be utilized for coupling the second valve body piece 86 to the first valve body piece 84. For example, the threading 317 of the first recess 316 may be aligned with the threading 327 of the protrusion 326. The socket 330 may be operable to receive a suitable tool configured to engage with the socket 330 to turn the second valve body piece 86 in relation to the first valve body piece 84. Turning the second valve body piece 86 in relation to the first valve body piece 84 may engage the threading 327 with the threading 317, thereby coupling second valve body piece 86 to first valve body piece 84. As shown, the socket 330 may be disposed at a central location of the second side 324 inline with the central axis 314 of the clapper 18. In certain embodiments, the socket 330 may be offset by a distance from the central axis 314.

FIG. 5 illustrates a cross-sectional view of a formed groove and the seal 88. As illustrated, the clapper 18 comprises the seal 88 at least partially disposed within a seal groove 500 of the first valve body piece 84 (referring to FIGS. 3 and 4). The seal groove 500 may be defined as the space between the shoulder 310, second side 308 of the first valve body piece 84, and the angled edge 320. The seal groove 500 may be any suitable size, height, shape, and any combinations thereof. For example, a portion of the seal groove 500 may be curvilinear, straight, angled, or any combination thereof. As illustrated, the seal groove 500 may comprise an end face 502 and an inner radial face 504. The end face 502 may be a portion of the second side 308 of the first valve body piece 84 approximate to the shoulder 310. The end face 502 may face in a first axial direction in relation to the first valve body piece 84, wherein the first axial direction is the same direction as the second direction 30 (referring to FIG. 1) for fluid flow. The inner radial face 504 may face radially inward in relation to the first valve body piece 84. The inner radial face 504 may be a curvilinear segment of the seal groove 500 between the end face 502 and the shoulder 310. At least a portion of the seal 88 may be compressed into the seal groove 500 as the second valve body piece 86 (referring to FIGS. 3 and 4) couples to the first valve body piece 84. The seal 88 may comprise a flexible material, such as urethane or rubber, to undergo an elastic deformation when compressed into the seal groove 500.

The seal 88 may have any suitable size and shape. The seal 88 may comprise a groove or a recess (referred to herein as the "second recess 332") configured to receive the shoulder 310 of the first valve body piece 84. The second recess 332 may comprise the same general shape as the shoulder 310 in order to accommodate receiving the shoulder 310. As the seal 88 is disposed into the seal groove 500, the second recess 332 may receive the shoulder 310. In an initial position, the seal 88 may not completely fill the seal groove 500. The seal 88 may generally comprise a bulbous portion 506 that does not align with the seal groove 500. In certain embodiments, the second recess 332 may be disposed adjacent to the bulbous portion 506 and may partly define the bulbous portion 506. The bulbous portion 506 may generally be rounded and may not fit between the shoulder 310 and angled edge 320. There may be a space 508 between the bulbous portion 506 and a portion of the seal groove 500 wherein the seal 88 is not entirely secured within the seal groove 500. As illustrated, the space 508 may be formed approximately at a junction between the angled edge 320 and the end face 502. The space 508 is not limited to this location and may be formed at a different location along the seal groove 500, such as between the end face 502 and an end of the shoulder 310 along the inner radial face 504.

During manufacture and assembly of the clapper 18 (referring to FIGS. 3 and 4), the seal 88 may be compressed to fill the space 508 of the seal groove 500 with the bulbous portion 506. Manufacturing the clapper 18 may comprise forming the first valve body piece 84 having the seal groove 500 and forming the second valve body piece 86 having the angled edge. The seal 500 may then be inserted within the seal groove 500 of the first valve body piece 84, and the second valve body piece 86 may be attached to the first valve body piece 84, wherein attaching the second valve body piece 86 to the first valve body piece 84 may include threading the second valve body piece 86 into the first valve body piece 84.

Initially, the seal 88 may be disposed along the outer edge 312 of the first valve body piece 84, wherein the shoulder 310 is received by the second recess 332. The second valve body piece 86 may then be aligned to couple to the first valve body piece 84. Once the threading 327 (referring to FIGS. 3 and 4) of the protrusion 326 (referring to FIGS. 3 and 4) aligns with the threading 317 (referring to FIGS. 3 and 4) of the first recess 316 (referring to FIGS. 3 and 4), the second valve body piece 86 may rotate in relation to the first valve body piece 84 to couple to the first valve body piece 84. As the second valve body piece 86 couples to the first valve body piece 84, the distance between the first side 322 (referring to FIGS. 3 and 4) of the second valve body piece 86 and the second side 308 of the first valve body piece 84 may decrease until the first side 322 abuts the second side 308. Once assembled, the angled edge 320 may be angled towards the end face 502 of the first valve body piece 84 facing a second axial direction equal to the first direction 22 (referring to FIG. 1) for fluid flow. When the first and second valve body pieces 84, 86 are coupled together, the angled edge 320 may be disposed at an angle $\theta 1$ with respect to the second side 308 of first valve body piece 84. Without limitations, angle $\theta 1$ may be within a range of about 90° to about 180°. In embodiments, angle $\theta 1$ may be within a range of about 95° to about 135°.

As the protrusion 326 (referring to FIGS. 3 and 4) is threaded into the first recess 316 (referring to FIGS. 3 and 4), the seal 88 may be compressed to force the bulbous portion 506 completely within the seal groove 500 to secure its placement. Compressing the bulbous portion 506 may further fill the space 508 with a portion of the bulbous portion 506, wherein the bulbous portion 506 may be flexible or elastic to accommodate the space 508. By compressing the bulbous portion 506 into the space 508, the clapper 18 may operate in the valve assembly 10 (referring to FIG. 1) with the seal 88 secured through a compression fit.

While several embodiments have been provided in the present disclosure, it should be understood that the disclosed systems and methods might be embodied in many other specific forms without departing from the spirit or scope of the present disclosure. The present examples are to be considered as illustrative and not limiting, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A clapper, comprising:
a first valve body piece having a seal groove;
a second valve body piece having an angled edge,
wherein the second valve body piece is separate from the first valve body piece; and
a seal disposed in the seal groove of the first valve body piece,
wherein, when the first and second valve body pieces are coupled together, radial compression of the seal between the seal groove and the angled edge causes the seal to be retained within the clapper,
wherein the seal groove includes an end face, facing in a first axial direction in relation to the first valve body piece, and an inner radial face, facing radially inward in relation to the first valve body piece,
wherein the inner radial face is formed on a shoulder extending in the first axial direction away from the end face, and
wherein the shoulder fits into a groove in the seal.

2. The clapper of claim 1, wherein the first valve body piece includes a threaded bore, and wherein the second valve body piece includes a threaded stem configured to fit inside the threaded bore to couple together the first and second valve body pieces.

3. The clapper of claim 1, wherein the first valve body piece is formed of tool steel and the second valve body piece is formed of stainless steel.

4. The clapper of claim 1, wherein, when the first and second valve body pieces are coupled together, the angled edge is angled towards the end face of the first valve body piece.

5. The clapper of claim 1, wherein, when the first and second valve body pieces are coupled together, the angled edge is facing in a second axial direction, wherein a relative angle between the first and second axial directions is within a range of about 95 degrees to about 135 degrees.

6. The clapper of claim 1, wherein the first valve body piece includes a hinged portion on a first side opposite the shoulder.

7. The clapper of claim 1, wherein the inner radial face, of the seal groove, includes a curvilinear segment between the end face and the shoulder.

8. A valve assembly, comprising:
a valve housing;
a valve seat disposed in the valve housing and defining a fluid passageway;
a hanger disposed in the valve housing and proximate to the valve seat; and
a clapper pivotably coupled to the hanger, wherein the clapper is configured to rotate between an open position and a closed position, wherein the open position provides fluid flow through the fluid passageway, and wherein the clapper engages the valve seat in the closed position to at least partially restrict fluid flow through the fluid passageway, wherein the clapper comprises:
a first valve body piece having a seal groove;
a second valve body piece having an angled edge,
wherein the second valve body piece is separate from the first valve body piece; and
a seal disposed in the seal groove of the first valve body piece,
wherein, when the first and second valve body pieces are coupled together, radial compression of the seal between the seal groove and the angled edge causes the seal to be retained within the clapper,
wherein the seal groove includes an end face, facing in a first axial direction in relation to the first valve body piece, and an inner radial face, facing radially inward in relation to the first valve body piece,
wherein the inner radial face is formed on a shoulder extending in the first axial direction away from the end face, and
wherein the shoulder fits into a groove in the seal.

9. The valve assembly of claim 8, wherein the first valve body piece includes a threaded bore, and wherein the second valve body piece includes a threaded stem configured to fit inside the threaded bore to couple together the first and second valve body pieces.

10. The valve assembly of claim 8, wherein the first valve body piece is formed of tool steel and the second valve body piece is formed of stainless steel.

11. The valve assembly of claim 8, wherein, when the first and second valve body pieces are coupled together, the angled edge is angled towards the end face of the first valve body piece.

12. The valve assembly of claim 8, wherein, when the first and second valve body pieces are coupled together, the angled edge is facing in a second axial direction, wherein a relative angle between the first and second axial directions is within a range of about 95 degrees to about 135 degrees.

13. The valve assembly of claim 8, wherein the first valve body piece includes a hinged portion on a first side opposite the shoulder.

14. The valve assembly of claim 8, wherein the inner radial face, of the seal groove, includes a curvilinear segment between the end face and the shoulder.

15. A method of manufacturing a clapper, comprising:
forming a first valve body piece having a seal groove;
forming a second valve body piece having an angled edge;
inserting a seal within the seal groove of the first valve body piece; and
attaching the second valve body piece to the first valve body piece,
wherein radial compression of the seal between the seal groove and the angled edge causes the seal to be retained with the clapper when the first and second valve body pieces are assembled together,
wherein the seal groove includes an end face, facing in a first axial direction in relation to the first valve body piece, and an inner radial face, facing radially inward in relation to the first valve body piece,
wherein the inner radial face is formed on a shoulder extending in the first axial direction away from the end face, and
wherein the shoulder fits into a groove in the seal.

16. The method of claim 15, wherein attaching the second valve body piece to the first valve body piece includes threading the second valve body piece into the first valve body piece.

17. The method of claim 16, wherein the first valve body piece includes a recess and the second valve body piece includes a protrusion received within the recess during the threading.

18. The method of claim 15, wherein the first valve body piece is formed of tool steel and the second valve body piece is formed of stainless steel.

19. The method of claim 15, wherein the inner radial face, of the seal groove, includes a curvilinear segment between the end face and the shoulder.

* * * * *